(12) United States Patent
Nagashima et al.

(10) Patent No.: US 10,802,145 B2
(45) Date of Patent: *Oct. 13, 2020

(54) MEASURING DEVICE, MEASURING METHOD, AND PROGRAMS THEREFOR

(71) Applicant: TOPCON CORPORATION, Itabashi-ku, Tokyo (JP)

(72) Inventors: Hiroki Nagashima, Itabashi-ku (JP); Atsushi Shoji, Itabashi-ku (JP); Akira Oide, Itabashi-ku (JP)

(73) Assignee: TOPCON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/452,571

(22) Filed: Jun. 26, 2019

(65) Prior Publication Data

US 2019/0317215 A1    Oct. 17, 2019

Related U.S. Application Data

(63) Continuation of application No. 15/281,730, filed on Sep. 30, 2016, now abandoned.

(51) Int. Cl.
*G01S 17/42* (2006.01)
*G06T 17/00* (2006.01)

(52) U.S. Cl.
CPC .............. *G01S 17/42* (2013.01); *G06T 17/00* (2013.01); *G06T 2207/10028* (2013.01)

(58) Field of Classification Search
CPC ................... G01S 17/42; G06T 17/00; G06T 2207/10028
See application file for complete search history.

(56) References Cited

U.S. PATENT DOCUMENTS

| | | | | |
|---|---|---|---|---|
| 6,727,849 B1 * | 4/2004 | Kirk | ................ | G01C 15/00 342/357.52 |
| 6,732,051 B1 * | 5/2004 | Kirk | ................ | G01C 15/00 342/357.52 |

(Continued)

FOREIGN PATENT DOCUMENTS

| | | |
|---|---|---|
| EP | 1503176 A2 | 2/2005 |
| JP | 7-280645 A | 10/1995 |

(Continued)

OTHER PUBLICATIONS

Notification of Reasons for Refusal issued in corresponding JP Application No. 2015-197586, dated Dec. 28, 2018, 9 pages.

*Primary Examiner* — Manuel A Rivera Vargas
*Assistant Examiner* — Yaritza H Perez Bermudez
(74) *Attorney, Agent, or Firm* — Xsensus LLP (57) ABSTRACT

A technique for efficiently performing operations for identifying a current position in a method of measuring electromagnetic waves is provided. A measuring device includes a measurement planned position data receiving unit 302, a current position data receiving unit 303, and a GUI controlling unit 306. The measurement planned position data receiving unit 302 receives data of measurement planned positions at each of which electromagnetic waves are measured. The current position data receiving unit 303 receives data of a current position of an electromagnetic wave measuring device. The GUI controlling unit 306 controls displaying of a relationship between the current position of the electromagnetic wave measuring device and the measurement planned position on a display based on data of the measurement planned positions and data of the current position.

5 Claims, 10 Drawing Sheets

(56) References Cited

U.S. PATENT DOCUMENTS

| | | | |
|---|---|---|---|
| 6,845,320 B2* | 1/2005 | Tompkins | G01C 21/30 340/991 |
| 9,741,241 B2* | 8/2017 | Mizui | H04N 1/00323 |
| 2006/0271298 A1* | 11/2006 | MacIntosh | G01V 3/38 702/5 |
| 2007/0044536 A1* | 3/2007 | Gunsaulis | E21B 7/04 73/1.79 |
| 2010/0241394 A1* | 9/2010 | Ihara | G01B 21/24 702/151 |
| 2012/0133918 A1* | 5/2012 | Sakimura | G01C 15/002 356/4.01 |
| 2013/0152412 A1* | 6/2013 | Kumagai | G01C 15/004 33/291 |
| 2014/0247439 A1* | 9/2014 | Neier | G01C 15/002 356/4.01 |
| 2014/0285375 A1* | 9/2014 | Crain | G01S 13/885 342/25 A |
| 2015/0160342 A1* | 6/2015 | Zweigle | G09B 29/004 356/5.01 |
| 2016/0377707 A1* | 12/2016 | Sasaki | G01S 7/497 356/4.01 |
| 2017/0023351 A1* | 1/2017 | Isozaki | G01J 1/0219 |
| 2017/0023403 A1* | 1/2017 | Isozaki | G01J 1/0266 |
| 2017/0097260 A1* | 4/2017 | Nagashima | G01B 11/002 |
| 2017/0097262 A1* | 4/2017 | Nagashima | G01B 11/00 |
| 2017/0115161 A1* | 4/2017 | Nagashima | G01J 1/0242 |

FOREIGN PATENT DOCUMENTS

| JP | 9-68478 A | 3/1997 |
|---|---|---|
| JP | 10-9951 A | 1/1998 |
| JP | 2005-043088 | 2/2005 |
| JP | 2012-057960 A | 3/2012 |

* cited by examiner

MEASURING DEVICE, MEASURING METHOD, AND PROGRAMS THEREFOR

CROSS-REFERENCE TO RELATED APPLICATIONS

This application is a continuation of U.S. application Ser. No. 15/281,730, filed Sep. 30, 2016, and claims priority to JP 2015-19586, filed Oct. 5, 2015, the entire contents of each are incorporated herein by reference.

BACKGROUND OF THE INVENTION

Technical Field

The present invention relates to a technique for measuring electromagnetic waves such as light from lighting equipment.

Background Art

For example, illuminance in an area equipped with lighting equipment is specified in the illuminance standard of the Japanese Industrial Standards (JIS). Each lighting equipment must satisfy the JIS. For this reason, it is necessary to test whether the condition of lighting satisfies the JIS when lighting equipment is installed or replaced. Regarding the technique for the testing, for example, a technique disclosed in Japanese Unexamined Patent Application Laid-Open No. 7-280645 is publicly known.

For example, the work for testing whether lighting equipment satisfies the JIS may be performed for each type of sporting grounds. In such a case, the work should be performed at a large number of measurement points that are set in a grid. This work is performed by identifying or marking each of the measurement points and then measuring illuminance at the identified position of each of the measurement points. For track-and-field stadiums and soccer grounds, since such athletic grounds are extensive, the work should be performed at measurement points of not less than several tens multiplied by several tens, and thus, the work is complicated and takes a long time. Moreover, the measurement may be taken by varying the illuminance of the lighting equipment. In such a case, the work is further complicated.

SUMMARY OF THE INVENTION

In view of these circumstances, an object of the present invention is to provide a technique for efficiently performing operations for identifying a current position in a method of measuring electromagnetic waves.

A first aspect of the present invention provides a measuring device including a controlling unit that is configured to control displaying of a relationship between a measurement planned position for an electromagnetic wave and a current position of an electromagnetic wave measuring device, on a display. The relationship is obtained based on first data relating to the measurement planned position for the electromagnetic wave and based on second data relating to the current position of the electromagnetic wave measuring device. The current position of the electromagnetic wave measuring device is measured by an appropriate measuring means.

According to a second aspect of the present invention, in the invention according to the first aspect of the present invention, the controlling unit may control displaying of a direction and a distance to the measurement planned position.

According to a third aspect of the present invention, in the invention according to the first or the second aspect of the present invention, the measuring device may also include a notification controlling unit that is configured to control displaying of a notice when a distance between the measurement planned position and the current position is not greater than a predetermined value.

According to a fourth aspect of the present invention, in the invention according to any one of the first to the third aspects of the present invention, the measuring device may also include a point cloud position data obtaining unit, a three-dimensional model generating unit, a matching relationship identifying unit, and a position judging unit. The point cloud position data obtaining unit is configured to obtain point cloud position data that is measured by a position measuring device, which is configured to measure a position of the electromagnetic wave measuring device. The three-dimensional model generating unit is configured to generate a three-dimensional model based on the point cloud position data. The matching relationship identifying unit is configured to identify a matching relationship between the three-dimensional model and a model of circumstances surrounding the position measuring device. The position judging unit is configured to identify a position of the position measuring device surrounded by the modeled circumstances, based on the matching relationship.

According to a fifth aspect of the present invention, in the invention according to the fourth aspect of the present invention, the point cloud position data may be measured by a laser scanner, and the position judging unit may identify the position of the position measuring device surrounded by the modeled circumstances, based on a positional relationship between the point cloud position data and the position measuring device and based on the matching relationship.

A sixth aspect of the present invention provides a measuring method including controlling displaying of a relationship between a measurement planned position for an electromagnetic wave and a current position of an electromagnetic wave measuring device, on a display. The relationship is obtained based on first data relating to the measurement planned position for the electromagnetic wave and based on second data relating to the current position of the electromagnetic wave measuring device.

A seventh aspect of the present invention provides a computer program product including a non-transitory computer-readable medium storing computer-executable program codes for measurement. The computer-executable program codes include program code instructions for controlling displaying of a relationship between a measurement planned position for an electromagnetic wave and a current position of an electromagnetic wave measuring device, on a display. The relationship is obtained based on first data relating to the measurement planned position for the electromagnetic wave and based on second data relating to the current position of the electromagnetic wave measuring device.

Electromagnetic waves include gamma rays, ultraviolet light, visible light, infrared light, microwaves, UHFs, VHFs, HFs (short waves), LFs (middle waves long waves, and electromagnetic waves of not more than several tens of kHz. Additionally, the present invention can also be understood as a system.

According to the present invention, the operations for identifying a current position are made efficient in the method of measuring electromagnetic waves.

PREFERRED EMBODIMENTS OF THE INVENTION

1. First Embodiment

Outline

Figure 1:
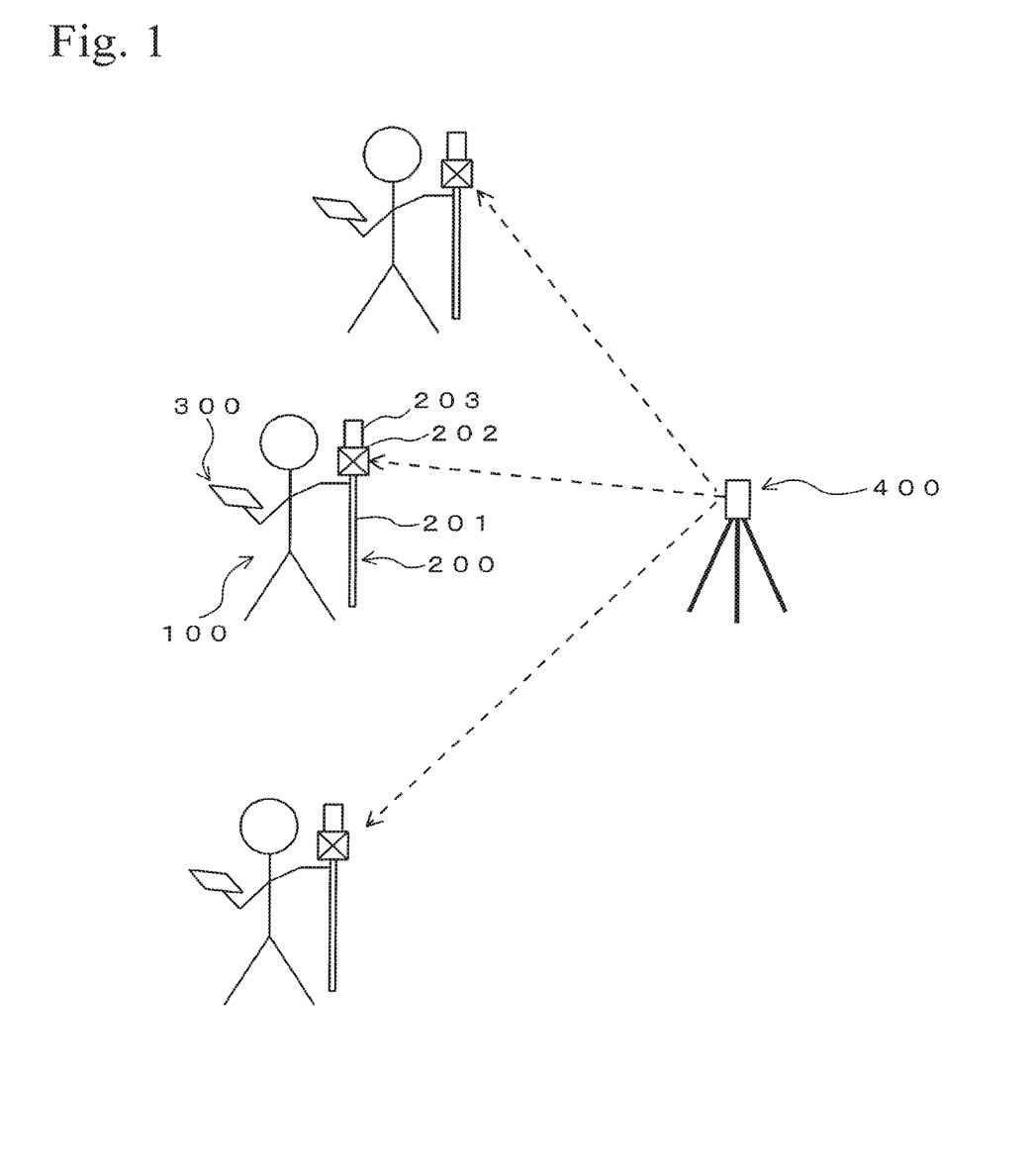
FIG. 1 is a conceptual diagram showing art outline of a work for measuring illuminance.

FIG. 1 shows an outline of work for measuring illuminance in an embodiment. In this embodiment, an operator 100 carries a measuring unit 200 and a terminal 300 and measures illuminance at a predetermined measurement point. FIG. 1 conceptually shows an example of a case in which the operator 100 moves carrying the measuring unit 200 and the terminal 300 for measuring at three points.

Structure of Hardware (1) Measuring Unit

The measuring unit 200 includes a rod-like support 201, a reflective prism 202 that is fixed on a top of the support 201, and an illuminometer 203 that is fixed on the reflective prism 202. The reflective prism 202 reflects measurement laser light from a position measuring device 400. The illuminometer 203 is connected to the terminal. 300, which is carried by the operator, and the illuminometer 203 operates by control via the terminal 300. Illuminance data measured with the illuminometer 203 is stored in the terminal 300.

The position measuring device 400 emits measurement laser light to the surroundings while scanning. The measurement laser light hitting the reflective prism 202 is reflected thereat, and the reflected light is received by the position measuring device 400. The position measuring device 400 calculates a direction and a distance from the position measuring device 400 to the reflective prism 202 based on the emitting direction and propagation time of the measurement laser light. Thus, a relative positional relationship of the reflective prism 202 with respect to the position measuring device 400 is determined. The position of the position measuring device 400 is determined in advance so that information of the position of the reflective prism 202 will be obtained. Therefore, the position of the position measuring device 400 should be known in advance by preliminarily measurement using a high precision GNSS device or the like or by locating the position measuring device 400 at a known position.

Figure 2:
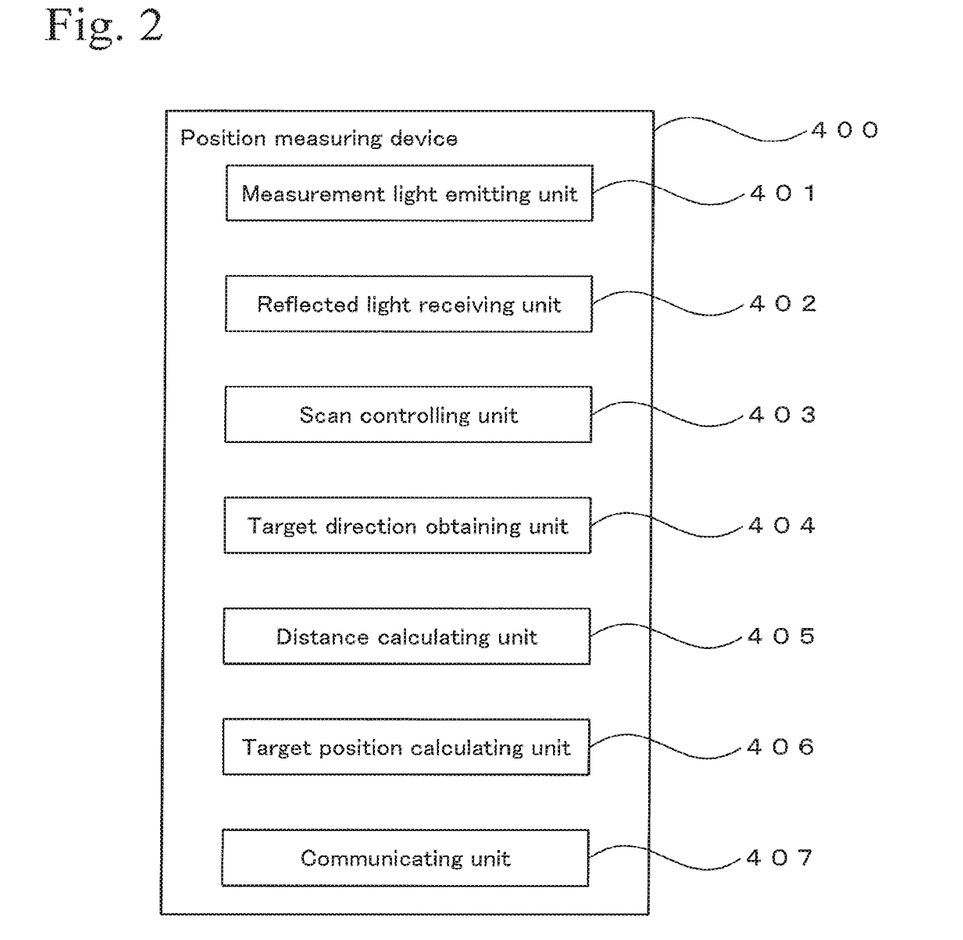
FIG. 2 is a block diagram of a position measuring device of an embodiment.

FIG. 2 shows a block diagram of the position measuring device 400. The position measuring device 400 includes a measurement light emitting unit 401, a reflected light receiving unit 402, a scan controlling unit 403, a target direction obtaining unit 404, a distance calculating unit 405, a target position calculating unit 406, and a communicating unit 407. The measurement light emitting unit 401 emits distance measurement laser light to the surroundings while scanning. The reflected light receiving unit 402 receives measurement light that has hit a target and that is reflected thereat. The target is the reflective prism 202 shown in FIG. 1. The measurement light emitting unit 401 and the reflected light receiving unit 402 are mounted on a rotatable table, whereby both emission of the measurement light and reception of the reflected light can be performed while the surroundings are scanned.

The scan controlling unit 403 controls the scanning using the measurement light. The target direction obtaining unit 404 obtains a direction of the target (in this case, the reflective prism 202) as viewed from the position measuring device 400, based on the emitting direction of the measurement light or the incident direction of the reflected light. The distance calculating unit 405 calculates a distance from the position measuring device 400 to the target based on a flight time (propagation tin and the speed of the measurement light.

The target position calculating unit 406 calculates the position of the target based on the known position of position measuring device 400, the direction of the target as viewed from the position measuring device 400, and the distance between the position measuring device 400 and the target. That is, by determining the direction of the target as viewed from the position measuring device 400 and the distance to the target, a relative positional relationship between the position measuring device 400 and the target is obtained. Here, in a condition in which the absolute position of the position measuring device 400 is already known, the absolute position of the target is determined based on the relative positional relationship. According to this principle, the target position calculating unit 406 calculates the absolute position or the position in the measurement field, of the target (reflective prism 202 in FIG. 1). In this embodiment, the reflective prism 202 and the illuminometer 203 are arranged close to each other, and thus, the position of the reflective prism 202 is treated as the position of the illuminometer 203.

The communicating unit 407 wirelessly communicates with the terminal 300. Any wireless communication standard can be used. For example, a communication standard such as Wi-Fi, Bluetooth (registered trademark), various types of wireless LANs, mobile phone network, or the like, may be used. The communicating unit 407 transmits data of the position of the target (the reflective prism 202 in FIG. 1) to the terminal 300. The data of the position of the target is calculated by the target position calculating unit 406.

(2) Terminal

As shown in FIG. 1, the operator carries the terminal 300. The terminal is a commercially available tablet that can be used as a mobile general purpose computer, and the terminal includes a CPU, a memory, and various types of interfaces. A dedicated terminal may be prepared and be used for the terminal 300 instead of using a general purpose computer. The operator performs work relating to illuminance measurement by using the terminal 300.

Figure 3:
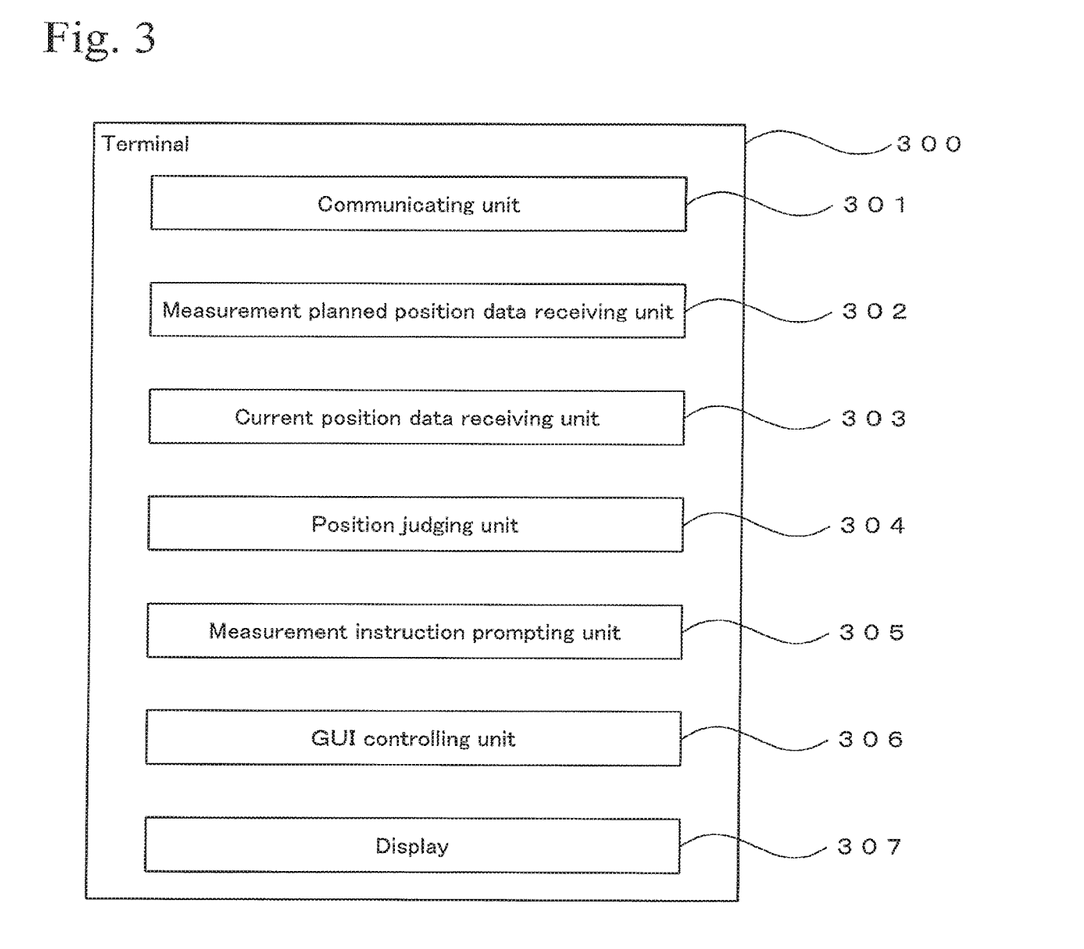
FIG. 3 is a block diagram of a terminal of an embodiment.

The terminal 300 includes a communicating unit 301, a measurement planned position data receiving unit 302, a current position data receiving unit 303, a position judging unit 304, a measurement instruction prompting unit 305, a GUI controlling unit 306, and a display 307. In this embodiment, the communicating unit 301 and the display 307 are constructed of hardware that is equipped on the tablet, and the other functional units are constructed by software and are executed by the operation of the CPU.

At least one of the functional units shown in FIG. 3 may be composed of a dedicated circuit. For example, each of the functional units shown in FIG. 3 may be composed of electronic circuits such as a CPU (Central Processing Unit), an ASIC (Application Specific Integrated Circuit), and a PLD (Programmable Logic Device) such as an FPGA (Field Programmable Gate Array).

Whether each of the functional units is to be constructed of dedicated hardware or to is be constructed of software so that programs are executed by a CPU, is selected in consideration of necessary operating speed, production cost, amount of electric power consumption, and the like. For example, a specific functional unit composed of an FPGA provides a superior operating speed but is high in production cost. On the other hand, a specific functional unit that is configured so that programs are executed by a CPU can be made by using general purpose hardware and is thereby low in production cost. However, a functional unit constructed by using a CPU provides an operating speed that is inferior to the operating speed of dedicated hardware. Moreover, such a functional unit may not be able to perform complicated operation. Constructing the functional unit by dedicated hardware and constructing the functional unit by software differ from each other as described above, but are equivalent to each other from the viewpoint of obtaining a specific function. Alternatively, multiple functional units may be composed of one circuit.

The communicating unit 301 communicates with the position measuring device 400 (refer to FIGS. 1 and 2). The measurement planned position data receiving unit 302 receives data of measurement planned positions at each of which illuminance is to be measured. In this embodiment, data of positions on a two dimensional plane is used. The measurement planned positions at each of which illuminance is to be measured are determined in advance and are input in the terminal 300 via the communicating unit 301. Naturally, data of measurement planned positions may be input in the terminal 300 via a publicly known storage medium, such as a USB memory or the like. The input data of the measurement planned positions is stored in a storage means (not Shown) of the terminal 300, such as a semiconductor memory or the like.

The current position data receiving unit 303 receives data of a current position of reflective prism 202, which is measured by the position measuring device 400. The data of the current position is received by the communicating unit 301 and is transmitted to the current position data receiving unit 303. The position judging unit 304 compares the current position of the reflective prism 202, which is received by the current position data receiving unit 303, and the measurement planned position, which is determined in advance and is received by the measurement planned position data receiving unit 302. Then, the position judging unit 304 judges whether the difference between the current position and the measurement planned position is not greater than a predetermined range. After the position judging unit 304 judges this difference as being not greater than the predetermined range, the measurement instruction prompting unit 305 performs processing for notification to prompt the operator to measure illuminance.

The GUI controlling unit 306 controls a GUI (Graphical User Interface), which is described later. The GUI is controlled by using a function that is equipped on an ordinary tablet. The GUI controlling unit 306 controls a UI (User Interface) display, which is described later. The display 307 is a liquid crystal display unit that is equipped in the terminal 300. The display 307 includes a touch panel sensor so that various kinds of controls will be performed by using the screen. This function utilizes the function of a commercially available tablet.

Moreover, the terminal 300 has an internal or external attitude sensor and obtains its attitude in a measuring condition after being calibrated. Details of the calibration are described later.

Outline of Operation

The position measuring device 400 measures the position of a target, that is, the position of the reflective prism 202 shown in FIG. 1, and transmits this information to the terminal 300 through wireless communication. The terminal 300 receives this information. Then, the terminal 300 compares a predetermined measurement planned position and the current position of the reflective prism 202, which is measured by the position measuring device 400, and calculates a positional relationship therebetween. This positional relationship between the measurement planned position and the measured current position of the reflective prism 202 is graphically displayed on the display 307 of the terminal 300 by the function of the GUI controlling unit 306 (refer to FIGS. 4A to 4C).

Figure 4A:
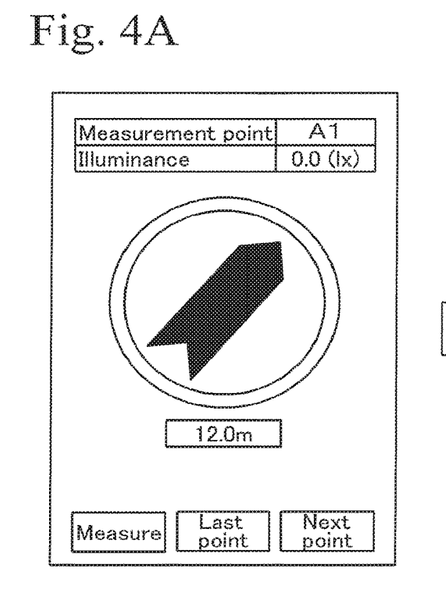
FIGS. 4A to 4C show examples of UI display screens.

After looking at an UI screen displayed on the display 307 of the terminal 300 as shown in FIG. 4A, the operator carrying the measuring unit 200 approaches the measurement planned position. Thereafter, when a specific condition is satisfied, the operator is prompted to measure illuminance by notification. The operator measures illuminance at the position, at which the operator has received the notification, by using the illuminometer 203 (refer to FIG. 1). These operations are performed for each of the measurement planned positions, whereby illuminance is measured at each of the measurement planned positions.

Examples of GUI Display Screens

Figure 4B:
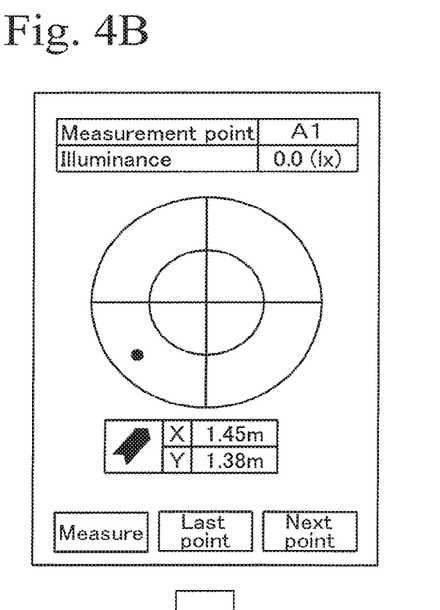
Figure 4C:
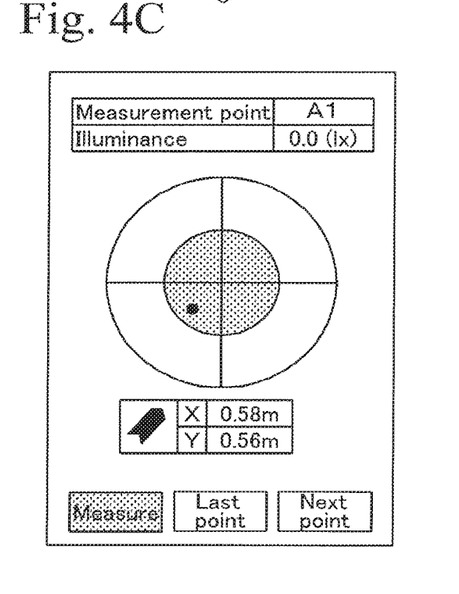

FIGS. 4A to 4C show examples of GUI screens (UI screens) displayed on the display 307 of the terminal 300 (refer to FIG. 3). The GUI is controlled by using the screens as shown in FIGS. 4A to 4C and is performed by the GUI controlling unit 306. FIG. 4A shows a distance and a direction to a measurement planned position. The terminal 300 includes an attitude sensor, and therefore displaying is controlled so that the direction of the display screen, as shown in FIGS. 4A and 4C, corresponds to the surrounding condition. Accordingly, for example, in the case shown in FIG. 4A, the screen indicates that the measurement planned position exists at a position apart from the current position by 12 meters in a right oblique direction by 45 degrees.

FIG. 4B shows a condition in which the reflective prism 202 comes to a position that is 1.45 meters in an X direction (right direction) and 1.38 meters in a Y direction (front direction) to the measurement planned position. FIG. 4C shows a condition in which the reflective prism 202 comes to a position that is 0.58 meters in the X direction (right direction) and 0.56 meters in the Y direction (front direction) to the measurement planned position. In these cases, the illuminance measurement is allowed to be performed at a position within a radius of 70 centimeters from the measurement planned position. Thus, when the distance between the current position of the reflective prism 202 and the measurement planned position is decreased to approximately 70 centimeters, a concentric circle indicating a radius of 70 centimeters is displayed so that approaching the measurement planned position will be recognized on the screen. Moreover, when this distance is decreased to approximately 70 centimeters or less, the color or the gradation of the color at a part of the screen is changed and is highlighted so as to notify the operator of being in close proximity to the measurement planned position. This notification may be performed by a sound or the like. FIG. 4C shows an example in which an icon for instructing measurement is highlighted. In this case, the illuminance measurement is performed with the illuminometer 203 after the operator touches the screen at the position corresponding to the icon.

Example of Processing

Figure 5:
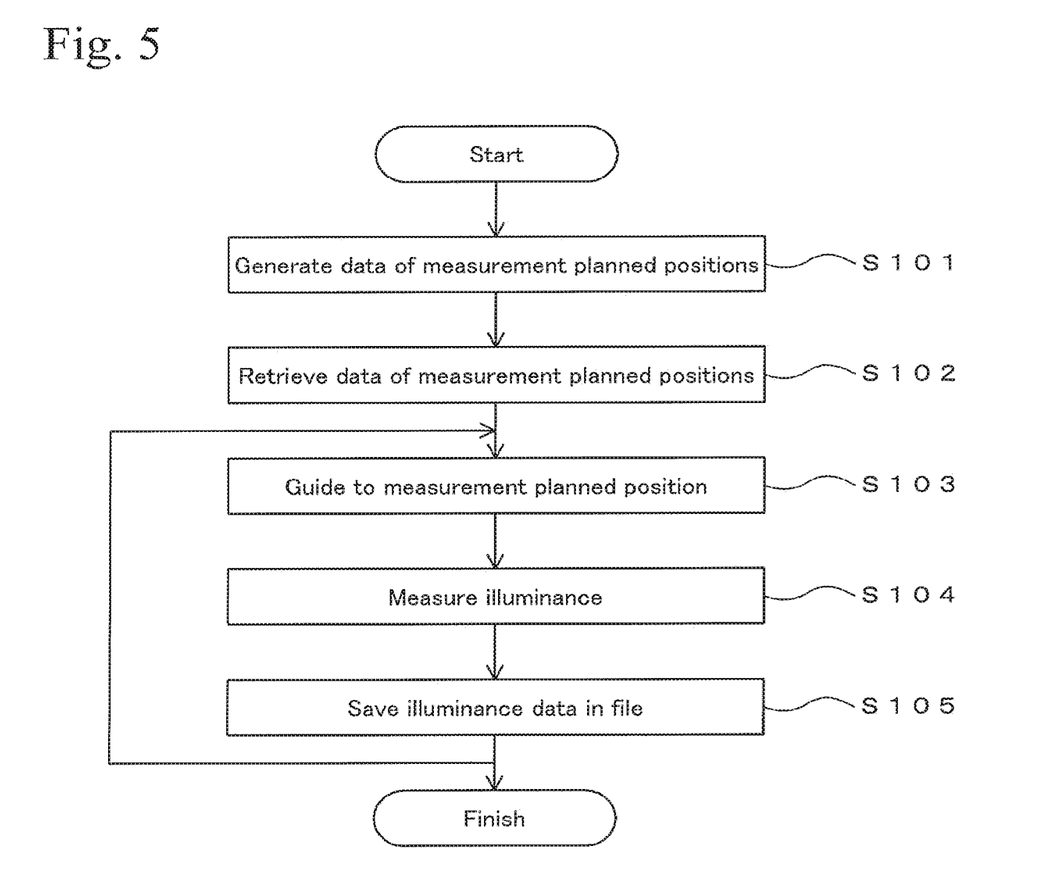
FIG. 5 is a flow chart showing an example of a processing procedure.

FIG. 5 shows a flow chart of an example of a processing procedure. Programs for executing the processing shown in FIG. 5 are stored in a memory of the terminal 300. The programs may be stored in an appropriate storage medium and may be provided therefrom. This is the same as in the case of processing shown in FIG. 7 or FIG. 9.

Here, a case of measuring illuminance of lighting equipment at a track-and-field stadium will be exemplified. First, the position measuring device 400 is located at an appropriate position on the field of the track-and-field stadium. The position of the position measuring device 400 is precisely identified by using a high precision GNSS device for survey. The position data of the position measuring device 400 is stored in the terminal 300. Moreover, the terminal 300 is calibrated so that the terminal 300 is prepared to measure a direction. The processing of this example is performed as described below.

First, map information of the track-and-field stadium is input in the terminal 300. Then, a position of the terminal 300 is measured at each of multiple positions within the track-and-field stadium by using the position measuring device 400. The attitude of the terminal 300 at each of the multiple positions is known by the attitude sensor equipped on the terminal 300. Thus, a relationship between the map information of the track-and-field stadium and the attitude of the terminal 300 is obtained. Consequently, the map information of the track-and-field stadium is displayed on the display 307 of the terminal 300 while the direction of the map corresponds to the condition of the stadium.

Figure 6:
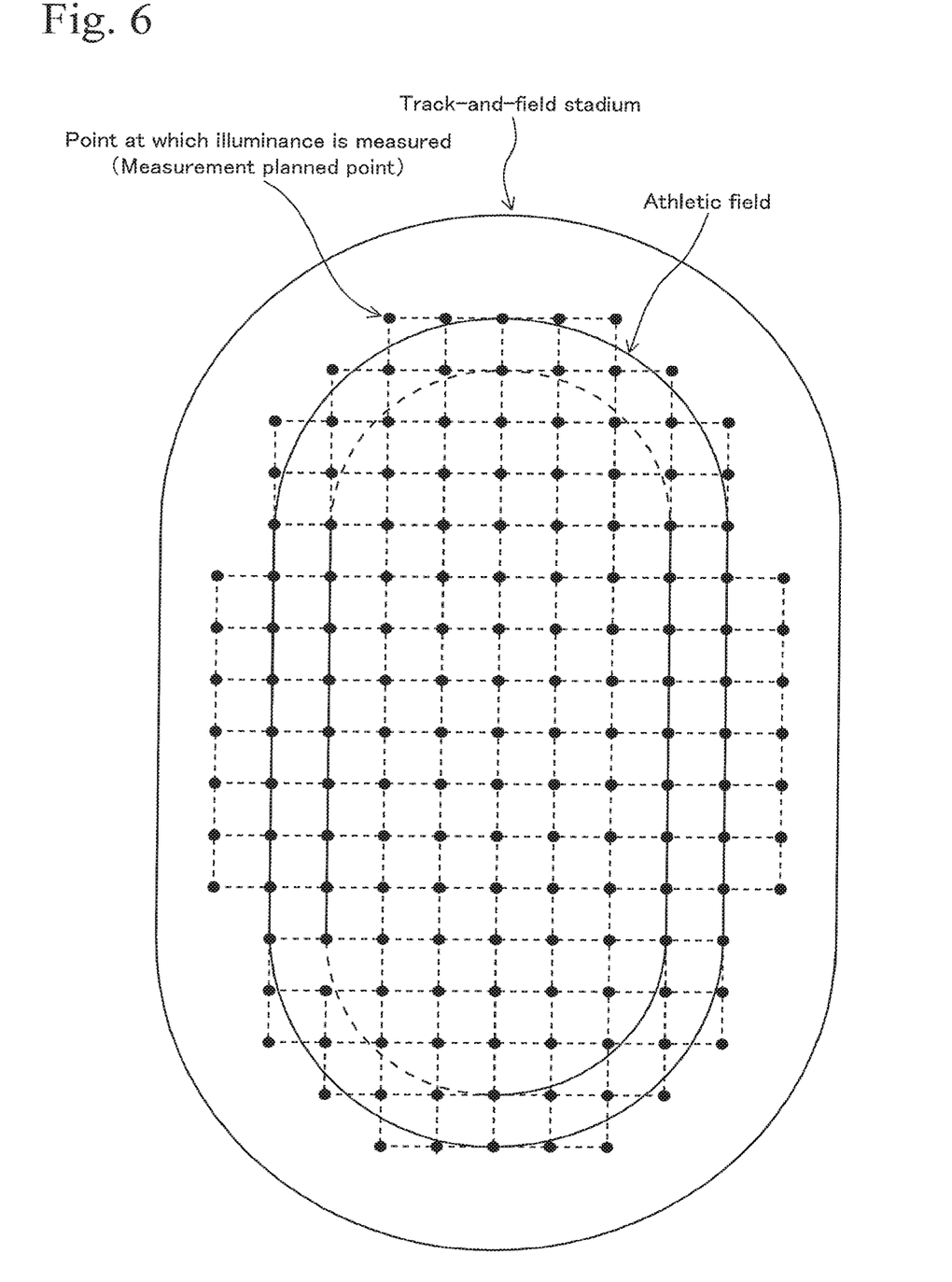
FIG. 6 shows an example of positions at each of which illuminance is measured.

Next, data of measurement planned positions is generated in accordance with a predetermined standard, such as JIS or the like, or a standard specified for the corresponding track-and-field stadium (step S101). In this case, as shown in FIG. 6, multiple grid points are set as measurement planned positions in the field of the track-and-field stadium. The data of the measurement planned positions is stored in the terminal 300 (step S102).

After a program relating to the processing that is exemplified in FIGS. 4A to 4C is started in the terminal 300, a measurement planned position that should be reached first is selected from the grid points shown in FIG. 6. Then, a UI screen for guiding to the selected position is displayed on the display 307 of the terminal 300 as shown in FIG. 4A. The operator looks at the UI screen display, as shown in FIG. 4A, and carries the illuminometer 203 to the selected measurement planned position, which is set in a grid (step S103). This operation is performed such that the operator walks while looking at the terminal 300 and carrying the measuring unit 200 by hand.

For example, when the screen as shown in FIG. 4A is displayed first, the operator understands the direction and the distance to the displayed measurement planned position and then walks to the displayed measurement planned position. When the measurement planned position approaches, the display screen is changed to a display screen as shown in FIG. 4B, by which a relative positional relationship between the current position and the measurement planned position is easy to visually understand. Here, in the display screen shown in FIG. 4B, the center of the concentric circles shows the measurement planned position, and the large black point shows the current position of the reflective prism 202 at that time. Additionally, the displayed inside concentric circle shows an area that can be regarded as the measurement planned position.

Then, the operator comes closer to the measurement planned position from the condition shown in FIG. 4B, and the reflective prism 202 enters the area which can be regarded as the measurement planned position. In this case, the area is an area of radius of 70 centimeters. At this time, the display screen is changed to a notification screen for notifying the operator of being in close proximity to the measurement planned position, as exemplified in FIG. 4C. In the notification screen in FIG. 4C, a highlighted image is displayed so as to notify the operator of being at a position at which the illuminance is appropriately measured.

At this stage, when the operator controls the terminal 300 and instructs the illuminance measurement, the illuminometer 203 measures illuminance (step S104). The data of the measured illuminance is stored in a storage file that is set in the memory of the terminal 300. In this case, the data of the illuminance is stored by being linked with coordinate data of the measured position and measurement time data (step S105).

The above processing is performed at each of the points, which are set in a grid, in turn, whereby illuminance data at each of the measurement planned positions is obtained.

Figure 7:
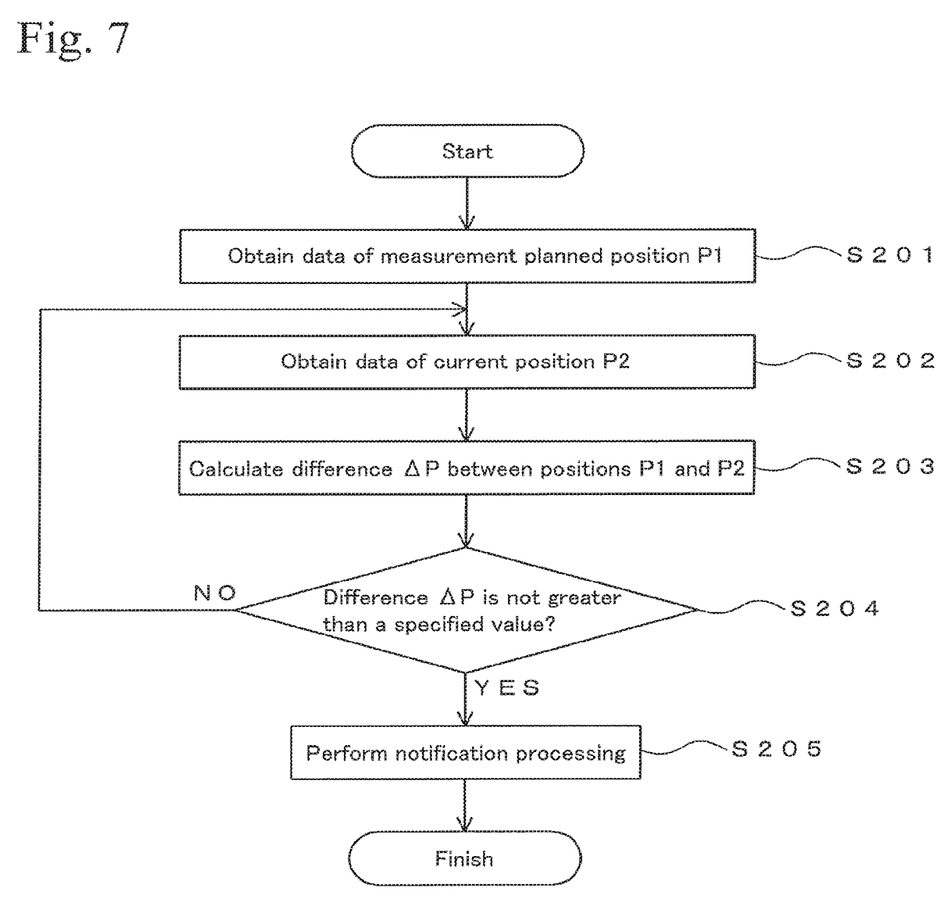
FIG. 7 is a flow chart showing an example of a processing procedure.

FIG. 7 shows an example of the processing relating to step S103. This processing is performed by the position judging unit 304 of the terminal 300. In this processing, first, position data of a measurement planned position P1 is obtained (step S201). Then, data of a measured current position P2 of the reflective prism 202 is obtained (step S202). Next, a difference (distance) ΔP between the positions P1 and P2 is calculated (step S203).

After the difference ΔP is calculated, whether the difference ΔP is not greater than a predetermined specified value (for example, 70 centimeters) is judged (step S204). If the difference ΔP is not greater than the specified value, notification processing is performed (step S205). Otherwise, the processing in step S202 and the subsequent steps is repeated.

Advantages

According to the above embodiment, a guide to a position that should be measured is displayed on the display of the terminal, whereby the operations for identifying a position of the illuminometer 203 are made efficient.

2. Second Embodiment

Outline

This embodiment relates to a technique for obtaining position data of the position measuring device 400 in the First Embodiment. For example, there may be cases in which positioning using a GNSS cannot be performed or is difficult at roofed stadiums and indoor facilities. A technique for measuring the position of the position measuring device 400 in such cases will be described hereinafter.

Structure

Figure 8:
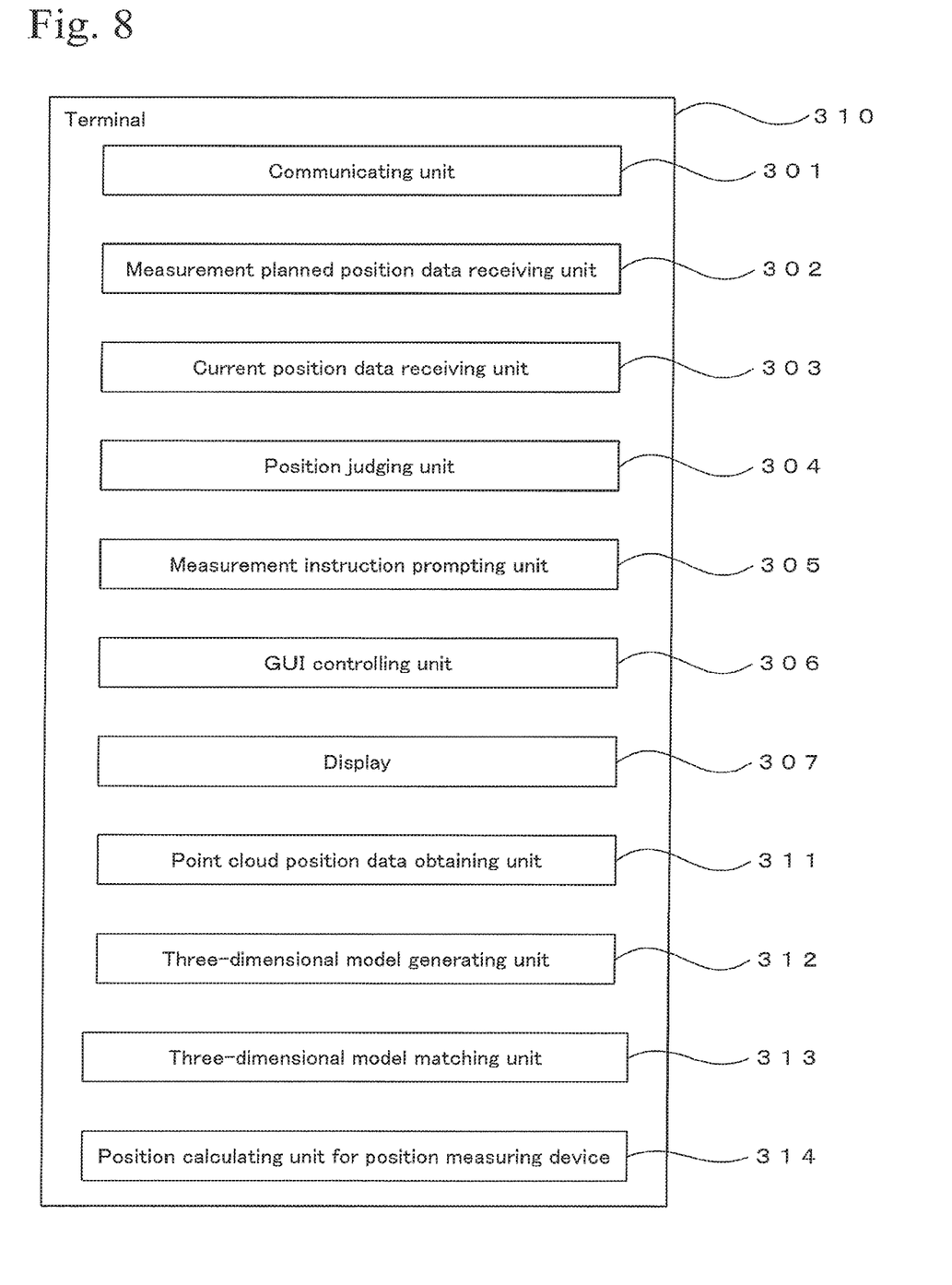
FIG. 8 is a block diagram of a terminal of an embodiment.

In this embodiment, a terminal 310 shown in FIG. 8 is used instead of the terminal 300 shown in FIG. 3. The terminal 310 is constructed by adding a point cloud position data obtaining unit 311, a three-dimensional model generating unit 312, a three-dimensional model matching unit 313, and a position calculating unit 314 for the position measuring device, to the terminal 300 shown in FIG. 3. The units shown in FIG. 8 are the same as the units shown in FIG. 3 and have the same functions as the units shown in FIG. 3. Additionally, whether each of the functional units is to be constructed of dedicated hardware or is to be constructed of software is also selected in the same way as in the case shown in FIG. 3.

In this embodiment, a position measuring device 400 having a laser scanner function is used in FIG. 2. In this case, laser light is emitted from the measurement light emitting unit 401 and is reflected at an object, and the reflected light is detected (received) by the reflected light receiving unit 402. This operation is performed at each point of the object, whereby point cloud position data of the object is obtained. Details of a laser scanner are disclosed in Japanese Unexamined Patent Application Laid-Open No. 2010-151682, for example.

The distance to the measured point, at which the measurement light hits, is determined from the flight time between the emission of the measurement light from the measurement light emitting unit 401 and the reception by the reflected light receiving unit 402. A relative position of the measured point with respect to the position measuring device 400 is obtained from the distance to the measured point and the emitting direction of the measurement light. This measurement is performed at each of numerous points while the object to be measured is scanned. A set (cloud) of position information of the numerous measured points is called point cloud position data. The point cloud position data is data in which the object is assumed to be constructed of a set (cloud) of points (measured points). Each of the points of the object is plotted in a three-dimensional space based on the point cloud position data, whereby a three-dimensional model of the object that is understood as being a set of points is obtained.

The point cloud position data obtaining unit 311 obtains point cloud position data, which is measured by using the laser scanner function of the position measuring device 400. The three-dimensional model generating unit 312 generates a three-dimensional model of the object based on the point cloud position data, which is obtained by the point cloud position data obtaining unit 311. Such a technique is disclosed in Japanese Unexamined Patent Applications Laid-Open Nos. 2012-230594 and 2014-035702, for example.

The three-dimensional model matching unit 313 performs processing for obtaining a matching relationship between a three-dimensional model of measurement surroundings, which is preliminarily prepared, and the three-dimensional model, which is generated by the three-dimensional model generating unit 312. Details of the matching of the three-dimensional models are disclosed in PCT International Publication No. WO 2012/141235, Japanese Unexamined Patent Applications Laid-Open Nos. 2014-035702 and 2015-046128, and Japanese Patent Application No. 2015-133736, for example.

The three-dimensional model of the measurement surroundings is a three-dimensional model of structures that are viewed from the position at which the position measuring device 400 is arranged. For example, when a baseball stadium is to be measured, the structure of the baseball stadium is three-dimensionally modeled, and this three-dimensional model is used as the three-dimensional model of the measurement surroundings. Recently, various kinds of structures can be designed by using CAD, and three-dimensional model data of a target structure can be obtained from the CAD data.

Operation

Figure 9:
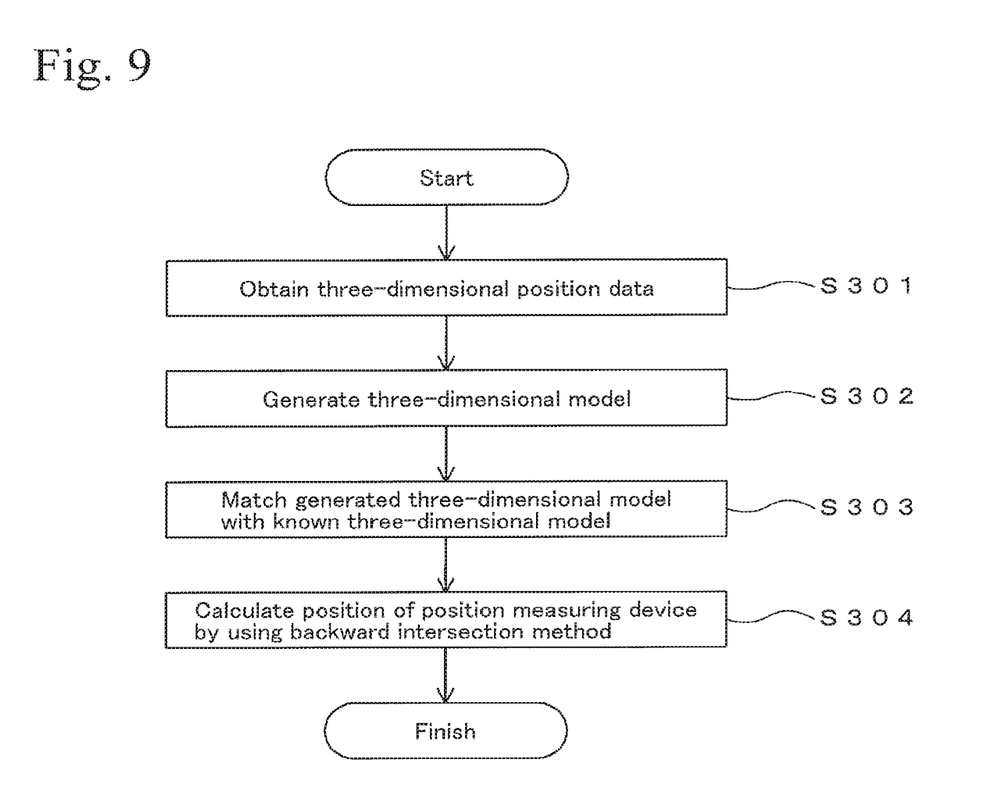
FIG. 9 is a flow chart showing an example of a processing procedure.

In this embodiment, processing for identifying the position of the position measuring device 400 in measurement surroundings is performed as described below. In this embodiment, a case of using a track-and-field stadium as the measurement surroundings is described. FIG. 9 shows an example of a processing procedure. In this processing, first, the position measuring device 400 is arranged at an appropriate position in the track-and-field stadium. A position within an athletic field is appropriate as the arranging position. Coordinates of the position of the position measuring device 400 in the track-and-field stadium are not necessarily known or are not necessarily precisely known at this stage. Under this condition, the following processing is started.

First, three-dimensional point cloud position data of the surroundings of the position measuring device 400 is obtained by using the laser scanner function of the position measuring device 400 (step S301). The three-dimensional point cloud position data may be obtained from the entirety of the surroundings (in this case, facilities and the like at the track-and-field stadium as viewed from the position measuring device 400) or may be obtained from a part of the surroundings. This step of the processing is performed by the point cloud position data obtaining unit 311.

After the point cloud position data is obtained, a three-dimensional model is generated based on this point cloud position data (step S302). This step of the processing is performed by the three-dimensional model generating unit 312. In this step, a three-dimensional model of the structures as viewed from the inner side of the track-and-field stadium is obtained. In this case, structures outside the track-and-field stadium are not modeled. Nevertheless, since the generated three-dimensional model is made for identifying the arranging position of the position measuring device 400, no inconvenience will occur.

After the three-dimensional model is obtained, a matching relationship between a first three-dimensional model and a second three-dimensional model is determined (step S303). The first three-dimensional model is the three-dimensional model of the track-and-field stadium, which is preliminarily obtained. The second three-dimensional model is the three-dimensional model that is generated in step S302. This step of the processing is performed by the three-dimensional model matching unit 313.

Figure 10:
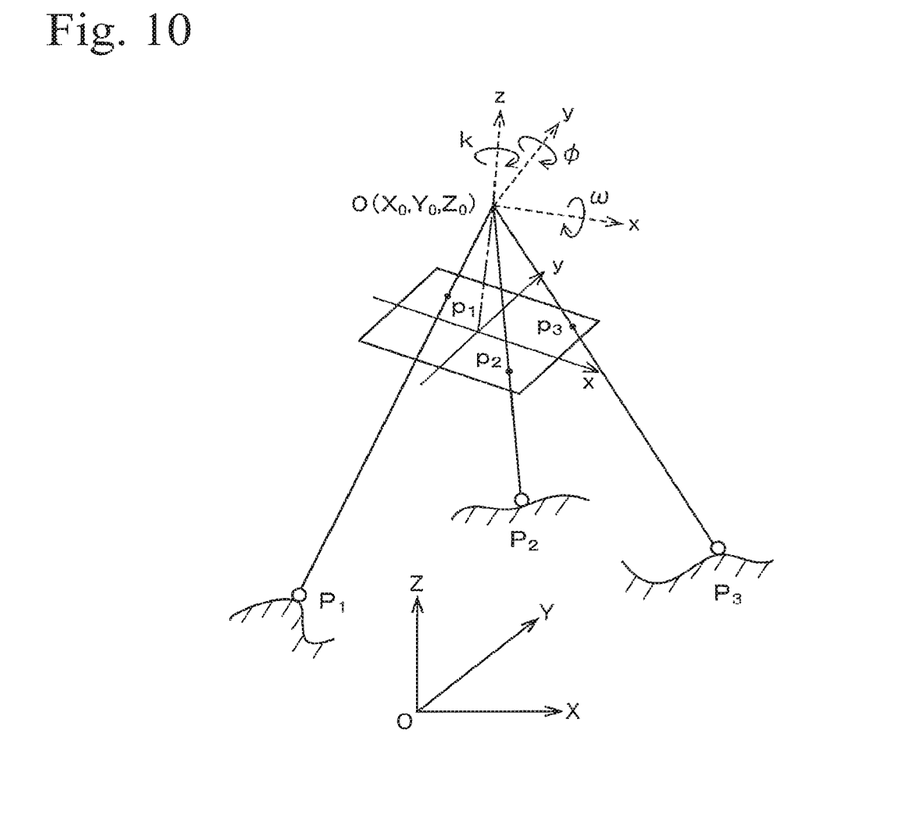
FIG. 10 shows a principle of a backward intersection method.

After the matching relationship between the first three-dimensional model and the second three-dimensional model is determined, a relative positional relationship between the first three-dimensional model and the position measuring device 400 is determined by using a backward intersection method (step S304). The principle of the backward intersection method is shown in FIG. 10. The backward intersection method is a method of observing directions from an unknown point to at least three known points and calculating the position of the unknown point as the intersection point of these directional lines. As the backward intersection method, a single photo orientation or a DLT method (Direct Linear Transformation Method) may be used. Details of the intersection method may be found in "Technology of Positioning Solutions" (published by DENKISHOIN on April, 2010) on pages 182 and 184. Additionally, a specific example of a calculation method in the intersection method is disclosed in Japanese Unexamined Patent Application Laid-Open No. 2013-186816.

For example, in the case shown in FIG. 10, the points $P_1$ to $P_3$ are selected from an area at which the first three-dimensional model and the second three-dimensional model are matched with each other. Since the first three-dimensional model is obtained from known data, for example, design data of the track-and-field stadium, the positions of the points constituting the first three-dimensional model are known. That is, the positions of the points $P_1$ to $P_3$ are known. On the other hand, regarding the second three-dimensional model, the directional lines from an unknown point O to the points $P_1$ to $P_3$ correspond to light paths of the measurement laser light. Thus, three directional lines are obtained from the laser light directions for scanning the points $P_1$ to $P_3$. Then, coordinates of an intersection point of the three directional lines are calculated, whereby coordinates of unknown point O, that is, coordinates of the position measuring device 400 are obtained in a coordinate system that describes the points $P_1$ to $P_3$.

That is, the second three-dimensional model is generated based on the point cloud position data that is obtained by using the position of the position measuring device 400 as a viewpoint. Thus, the relative positional relationship between the second three-dimensional model and the position measuring device 400 is determined. Then, by determining the matching relationship between the first three-dimensional model and the second three-dimensional model, the relative positional relationship between the first three-dimensional model and the position measuring device 400 is determined. Since the position of the first three-dimensional model is known, the position of the position measuring device 400 can be calculated after the relative positional relationship between the first three-dimensional model and the position measuring device 400 is determined.

According to the processing in step S304, the position of the position measuring device 400 in the track-and-field stadium is identified. That is, the arranged position of the position measuring device 400 in the track-and-field stadium is identified. After the position of the position measuring device 400 in the track-and-field stadium is identified, illuminance of lighting equipment is measured at a predetermined position in the track-and-field stadium in accordance with the processing procedure described in the First Embodiment.

The second three-dimensional model may be converted into a plane model, which is a two-dimensional model corresponding to a plane view as viewed from an upward vertical direction. Then, the plane model may be compared with a plane view of structures surrounding the measurement field as shown in FIG. 6, whereby a matching relationship therebetween may be determined. In this case, the position of the position measuring device 400 in the plane view as shown in FIG. 6 is identified. Here, an image that is obtained by photographing the track-and-field stadium from an upward vertical direction may be used instead of the plane view. In this case, the matching is performed by using a matching technique for obtaining a matching relationship between plane images. Such a matching technique for obtaining a matching relationship between plane images includes template matching and a technique disclosed in Japanese Unexamined Patent Application Laid-Open No. 2013-178656.

Additionally, smart phones having a position measuring function using a GNSS have been developed recently. Moreover, positioning techniques such as a method using radio waves from base stations for mobile phones and a method using radio waves of wireless LAN are publicly known. These techniques are easy and convenient but are performed at a positioning precision of approximately 5 to 10 meters or greater. Accordingly, such techniques alone cannot be used in the technique of the present invention. Still, such an easy and convenient positioning method and the method for identifying the position measuring device 400 by using the point cloud position data in the above embodiments may be used together. In this case, the operation is easily performed without using a dedicated GNSS device, and the positioning is performed at high precision.

3. Other Matters

In the processing shown in FIG. 5, illuminance data is obtained by repeating the step of guiding to the measurement planned position and the subsequent step of measuring illuminance. Alternatively, first, the position may be identified and be marked with respect to each of the measurement planned positions. Then, illuminance may be measured at each of the marked measurement planned positions. Additionally, data such as of chromaticity, wavelength distribution characteristic, or the like, may be measured in addition to the illuminance. Moreover, the present invention can be used in a technique for measuring electromagnetic waves for communication, such as radio waves of a wireless LAN, radiation such as gamma rays, light in the invisible ultraviolet region or infrared region, electromagnetic waves generated by high-voltage transmission lines or high-voltage electric equipment, etc.

Illuminance of a ray of light from a specific direction can also be measured. In this case, an attitude sensor is secured on the measuring unit 200 and is configured to output to the terminal 300. Then, the terminal 300 is made to display the direction of the illuminometer 203 in each of the display screens in FIGS. 4A to 4C. Here, the direction of the illuminometer 203 is displayed in each of the screens in FIGS. 4A to 4C when the measuring unit 200 is rotated around a vertical axis. Accordingly, the operator can know the direction of incident light, of which the illuminance cart be measured.

The field to be measured is not limited to athletic fields and may include rooms, public spaces such as stations, commercial facilities, rooms for public transportation, fields and mountains, etc.

The illuminance may be automatically measured when a predetermined condition is satisfied, instead of performing the notification processing for prompting the operator to measure illuminance in step S205.

Although a situation in which the operator performs measurement while walking is shown in FIG. 1, the operator may move while riding on an appropriate moving means, such as an electric cart for movement. In this case, the measuring unit 200 is fixed on the moving means.

The measuring unit 200 may be fixed on an autonomous moving means such as a driverless electric cart, and the autonomous moving means may be autonomously moved by using control data for performing UI shown in FIGS. 4A to 4C. In this case, an autonomous movement controlling unit is prepared in the terminal 300, and the autonomous movement controlling unit controls the movement of the autonomous moving means by using the control data for performing UI shown in FIGS. 4A to 4C. The autonomous movement controlling unit may be prepared as an external device.

The autonomous movement controlling unit performs control as described below, for example. For example, in the situation shown in FIG. 4A, a control signal for moving the autonomous moving means 12 meters in an oblique right direction by 45 degrees is generated, and the autonomous moving means moves in accordance with this control signal. Similarly, in the situation shown in FIG. 4B, a control signal for moving the autonomous moving means 1.45 meters in the X direction and 1.38 meters in the Y direction is generated, and the autonomous moving means moves in accordance with this control signal. Then, when the situation comes to the stage shown in FIG. 4C, a control signal for instructing illuminance measurement is transmitted from the terminal 300 to the illuminometer 203, and illuminance is measured. The above processing is performed at each of the measurement planned positions at which the autonomous moving means is reachable. Usage of this autonomous control greatly eliminates the burden from the operator. Additionally, a remote control moving means, such as a radio controlled electric cart, may be used as the autonomous moving means.

What is claimed is:

1. A device for measuring illuminance of lighting equipment, comprising:
    processing circuitry configured to perform as a measurement planned position data receiver that receives two-dimensional position data of measurement planned positions at each of which illuminance of lighting equipment is to be measured by an illuminometer, the illuminometer including a reflective prism in an integrated manner;
    the processing circuitry further configured to perform as a current position data receiver that receives two-dimensional position data of a current position of the illuminometer, which is obtained by measuring a position of the reflective prism by a position measuring device using laser light; and
    the processing circuitry further configured to perform as a graphical user interface that displays a two-dimensional position relationship between the measurement planned position and the illuminometer, on a display,
    wherein the graphical user interface displays a horizontal direction and a distance from the measured two-dimensional position of the illuminometer and the measurement planned position, on the display.

2. The device according to claim 1, wherein the processing circuitry is further configured as a measurement instruction prompt controller that controls displaying of a notice when a distance between the measurement planned position and the current position is not greater than a predetermined value.

3. The device according to claim 1, wherein the processing circuitry is further configured as a measurement instruction prompt controller that controls displaying of a notice when a distance between the measurement planned position and the current position is not greater than a predetermined value.

4. A method for measuring illuminance of lighting equipment, comprising:
    receiving two-dimensional position data of measurement planned positions at each of which illuminance of lighting equipment is to be measured by an illuminometer, the illuminometer including a reflective prism in an integrated manner;
    receiving two-dimensional position data of a current position of the illuminometer, which is obtained by measuring a position of the reflective prism by a position measuring device using laser light; and
    displaying a two-dimensional position relationship between the measurement planned position and the illuminometer, on a display,
    wherein a horizontal direction and a distance from the measured two-dimensional position of the illuminometer and the measurement planned position are displayed on the display.

5. A non-transitory computer recording medium storing computer-executable instructions for measuring illuminance of lighting equipment, that, when executed by a computer processor, cause the computer processor to perform operations comprising:
    receiving two-dimensional position data of measurement planned positions at each of which illuminance of lighting equipment is to be measured by an illuminometer, the illuminometer including a reflective prism in an integrated manner;
    receiving two-dimensional position data of a current position of the illuminometer, which is obtained by measuring a position of the reflective prism by a position measuring device using laser light; and
    displaying a two-dimensional position relationship between the measurement planned position and the illuminometer, on a display,
    wherein a horizontal direction and a distance from the measured two-dimensional position of the illuminometer and the measurement planned position are displayed on the display.

* * * * *